Patented Oct. 5, 1948

2,450,863

UNITED STATES PATENT OFFICE 2,450,863

AMIDES FROM SULFONYL FLUORIDES

Mario S. Altamura, Brooklyn, N. Y., assignor to Socony-Vacuum Oil Company, Incorporated, a corporation of New York No Drawing. Application March 7, 1946, Serial No. 652,818

4 Claims. (Cl. 260—556)

The present invention relates to the amidation of sulfonyl fluorides and, more particularly, to the production of sulfonamides from petroleum oil and its fractions. This invention provides a method of making sulfonamides of the aliphatic and aromatic hydrocarbons present in natural or synthetic mineral oil distillates in which the aromatic constituents predominate.

Organic sulfonamides, either long-chain aliphatic, aromatic, or mixtures thereof, are becoming increasingly important from the industrial standpoint. Thus far, they have been used on a commercial scale in the preparation of wetting agents, plasticizers, and synthetic resins applicable as adhesives, stiffening agents and varnishes or form impregnating porous articles. They have been used as intermediates in the manufacture of germicidal, insecticidal, fungicidal, sanitizing and bleaching agents, and of other useful derivatives. Recently, organic sulfonamides have been patented as lubricants in metal-forming, shaping, and other machine operations. Also recently, the prior art discloses examples [Fox, U. S. P. 2,334,186 (1934)] of organic sulfonamide compositions of matter made from mineral oil fractions of an entirely aliphatic and alicyclic nature and possessing industrial uses.

The term "organic sulfonamide" may be defined as a composition of matter containing a hydrocarbon part to which is attached a sulfonamido ($SO_2NH_2$) group by means of a carbon-sulfur bond. An "N-substituted organic sulfonamide" is one wherein one or both of the sulfonamidohydrogens have been replaced by an organic group or radical. A "mineral oil sulfonamide composition," whether prepared from a natural or synthetic mineral oil fraction or distillate, is a complex mixture of hydrocarbon sulfonamides. An "organic sulfonyl halide" is a substance composed of a hydrocarbon part to which is attached a sulfonyl halide ($SO_2X$) group by means of a carbon-sulfur bond, and wherein X may be an atom of chlorine, bromine, iodine or fluorine. "Amidation" is the chemical process or reaction whereby the halogen is replaced by an amino ($NH_2$) group.

Organic sulfonamides have been prepared by a number of methods. The most common or classical method of preparation has been the reaction between a sulfonyl halide, generally sulfonyl chloride, and concentrated aqueous ammonia. Since the sulfonamides of commercial value are generally not of simple chemical structure, then the sulfonyl chlorides from which these would have to be prepared must of necessity be similar in structural characteristics. Although the reactivity of a sulfonyl chloride generally remains on a high level, its stability seems to diminish as the structure becomes large and complex. It becomes less stable to the effects of light, heat and storage. Accordingly, it becomes more difficult to concentrate or purify the sulfonyl chlorides as the structure becomes large or complex, so that operations such as recrystallization and distillation even under high vacuum produce appreciable loss from decomposition. Usually, the preparation of a sulfonyl chloride requires special care that hydrolysis, especially from the water used in washing, etc., does not take place to an appreciable extent. A mineral oil sulfonyl chloride composition, by virtue of its complex nature, is expected to exhibit decreased stability. The general practice in the art, when a material of this type or of similar nature is prepared, is to amidate it immediately or convert it to some other stable compound, such as for example a sulfonate of an alkali metal.

From the time of their first preparation and study by Steinkopf, et al. [J. Prakt. Chem. 117, 1–82 (1927)] the aromatic sulfonyl fluorides have become increasingly important in the sense of displacing the sulfonyl chlorides in the preparation of useful derivatives, such as the sulfonamides. The sulfonyl fluorides, although less reactive than the corresponding sulfonyl chlorides, have the advantage of being more stable. They are resistant to hydrolysis by water or dilute acid, thus demanding less care or attention in their preparation to the danger of decomposition by hydrolysis. They can be concentrated or purified by steam-distillation or by distillation in vacuo. Furthermore, they can be stored for long periods of time without any appreciable change. The mineral oil sulfonyl fluoride compositions are likewise characterized by a remarkable degree of stability as reported by Salzberg [U. S. P. 2,276,097 (1942)] in his work.

Whereas the sulfonyl chlorides amidate easily with aqueous or alcoholic ammonia, ammonium carbonate, and primary and secondary amines, requiring the use of ammonia gas in situ or liquid ammonia only in cases where the sulfonyl chloride molecules are large and complex, the sulfonyl fluorides on the other hand do not amidate as easily. The common practice in the art is to amidate sulfonyl fluorides with liquid ammonia under pressure, either at room or elevated temperatures, in order to obtain favorable yields of the corresponding sulfonamides.

The employment of liquid ammonia, either at room or elevated temperatures, as the amidating agent, however, introduces a number of disadvantages. Among these may be mentioned that amidation by this method is not generally convenient and requires additional precautions and care against ammonia hazards. Special equipment is required to provide for and maintain the necessary reaction conditions. Furthermore, the use of liquid ammonia under pressure requires the use of expensive autoclaves and an ammonia recovery plant.

A review of the prior art discloses several instances where organic sulfonyl halides have been reacted with urea or related compounds. In the majority of cases the reactions were carried out in the presence of a solvent or diluent, and in all cases the products obtained were not the corresponding sulfonamides, but either salts, addition compounds, or condensation products of urea. Sometimes side reaction or decomposition products were obtained in appreciable quantities. To cite a few of these reactions from the prior art, Powel and Dehn [J. Am. Chem. Soc. 39, 2444–54 (1917)] reacted benzenesulfonyl chloride with urea in dry ether and obtained the addition compound, benzenesulfonyl chloride urea. Ackerman [Z. physiol. Chem. 47, 366 (1906)] heated benzenesulfonyl chloride with urea at 100° C. He obtained the salt, guanylurea benzenesulfonate. Bodendorf and Senger [Ber. 72B, 571–6 (1939)] rubbed chloroacetylmethanesulfonyl chloride with urea at low temperatures; the result was a semi-ureide. Cox and Raymond, Jr. [J. Am. Chem. Soc. 63, 300–1 (1941)] reacted benzenesulfonyl chloride and ethylisourea hydrochloride in an aqueous sodium hydroxide medium at low temperatures. Benzenesulfonylethylisourea was formed. When benzenesulfonyl chloride and thiourea were reacted, Remsen and Turner [Am. Chem. J. 25, 190 (1901)] isolated phenyl benzenethiosulfonate, dithiourea dichloride, sulfur, and cyanamide. Steinkopf et al. (vide supra) reported that urea showed no effect on aromatic sulfonyl fluorides in boiling aqueous medium. The prior art discloses no instance of the reaction of an organic sulfonyl fluoride with urea or a related compound, either in the dry state or in situ, to give the corresponding sulfonamide.

It has now been discovered that sulfonyl fluorides produced by treating petroleum stocks can be amidated with urea or related compounds. Accordingly, it is an object of the present invention to provide a method for producing sulfonamides of the hydrocarbons present in natural or synthetic mineral oil. It is another object of the present invention to provide a method of producing sulfonamides from sulfonyl fluorides. It is a further object of the present invention to provide a method of producing sulfonamides in yields approximating those obtained by employing liquid ammonia and surpassing those obtained when employing other forms of ammonia. Other objects and advantages will become apparent from the following description.

Briefly, the invention consists in mixing together an organic sulfonyl fluoride (prepared, for example, by the reaction of fluorosulfonic acid on the hydrocarbon according to the method described by Steinkopf et al.) with urea and heating the mixture with efficient stirring at atmospheric pressure, at some suitable temperature between 160–190° C., and for a period of time between 2–8 hours. The temperature and period of heating selected depend upon the reactants used. The amidation is preferably carried out either in an open vessel or under an upright air condenser. If a high-boiling, inert organic solvent or diluent is employed, the reaction may be performed under reflux.

Illustrative of the application of the principles of the present invention are the following non-limiting examples.

An example of the synthetic mineral oil fraction, which may be used for the preparation of the sulfonyl fluoride composition and the subsequent amidation of the latter to the corresponding sulfonamide mixture, is a high-boiling, aromatic solvent obtained from the distillation of synthetic crude tower bottoms derived from multiple pass catalytic cracking operations. It contains approximately 85 per cent aromatic compounds of which about one-half are alkylated naphthalenes and one-half alkylated benzenes. Specifically, its composition is the following: benzene derivatives, 43.7 per cent; naphthalene derivatives, 42.7 per cent; and non-aromatics (paraffins and naphthenes), 13.6 per cent. The benzene derivatives are polyalkyl benzenes in which the alkyl groups have from 1 to 3 carbon atoms. Among these benzene derivatives are durene and its isomers. Of the naphthalene derivatives, naphthalene is present in the amount of about 1.8 per cent; methyl-naphthalenes in the amount of about 11.9 per cent; and dimethyl-naphthalenes to the extent of about 29.0 per cent.

The physical characteristics of this synthetic mineral oil fraction are:

Gravity, °A. P. I. ------------------------------ 27.9
Kinematic viscosity @ 100° F., Centistokes 1.2
Distillation (A. S. T. M. 158–41), °F.
    Initial ------------------------------ 364
    99% off at ------------------------ 524

For the sake of convenience, the hydrocarbon part of the molecule, derived from the synthetic mineral oil fraction used as the basic starting material, will be designated as R. Then the sulfonyl fluoride composition would be $RSO_2F$, and the corresponding sulfonamide composition, $RSO_2NH_2$.

In order to decide upon the molecular proportion to be used in the fluorosulfonation reaction, the average molecular weight of the mineral oil fraction was calculated from its physical constants and was found to be 140. This value approximates the molecular weight of one of the constituents of the mineral oil fraction, namely methylnaphthalene, which is 142.

*Preparation of the sulfonyl fluoride composition*

The method used for the fluorosulfonation of the synthetic mineral oil fraction is that described by Steinkopf et al. (vide supra) for the preparation of tetralinsulfonyl fluoride. The proportions of the reactants taken are such that the formation of the monosulfonyl fluoride or the introduction of one sulfonyl fluoride group ($SO_2F$) into the molecule of the hydrocarbon is favored.

One part by weight of the synthetic mineral oil fraction was added slowly and with efficient stirring to 2.9 parts of fluorosulfonic acid ($HOSO_2F$) maintained at 15–22° C. Temperatures up to 50° C. may be used. It is preferred to keep the temperature of the reaction at about room temperature when preparing alkyl aromatic sulfonyl fluorides. When higher temperatures than room temperature are used, or when the temperature becomes greater than about 50° C., di- and trisulfonyl fluorides are produced in increasing amounts. On the other hand, in exceptional cases only the mono-sulfonyl fluoride of some compounds have been produced at temperatures as high as 120° C. For example, at temperatures up to about 120° C. only the mono-sulfonyl fluorides have been produced from benzene. When operating at temperatures below room temperature and of the order of zero degrees centigrade and below, however, the yield of sulfonyl fluoride decreases with an increase in the yield of undesirable sulfone.

After the addition of the oil to the acid, stirring was continued at room temperature until the evolution of gas became feeble. The reaction mixture was then carefully poured with stirring upon cracked ice to decompose the excess fluorosulfonic acid, and the heavy sulfonyl fluoride mixture which separated out was taken up with ether. (Other solvents for the sulfonyl fluorides, such as benzene, chloroform, carbon disulfide, carbon tetrachloride, and the like may be used.) The etheral solution was washed with dilute sodium carbonate solution and then several times with water. After drying over anhydrous sodium sulfate, the ether solvent was removed by distillation, and the crude sulfonyl fluoride mixture was topped to 65-70° C. at about 5 millimeters pressure. Nine-tenths part of a dark reddish-brown, slightly viscous oil was obtained. This was equivalent to a yield of 58.7 per cent of theory. A sulfur content of 12.91 per cent and a fluorine content of 7.49 per cent were found by analysis.

A portion of the crude sulfonyl fluoride composition was purified or concentrated by distillation in vacuo at 5 millimeters pressure. The fraction which distilled over at 130-170° C., equivalent to 55 per cent of the crude product used, was collected as a light yellowish-brown, mobile liquid which darkened upon standing. Analysis gave a sulfur content of 13.65 per cent (calculated for the mixture, 14.41 per cent) and a fluorine content of 6.90 per cent and 6.30 per cent (calculated, 8.56 per cent). The crude sulfonyl fluoride composition may also be partly purified or concentrated by steam-distillation. The residue which remains from the vacuum-distillation or the steam-distillation is probably a mixture of sulfones. The mixture of new sulfonyl fluorides thus obtained was found to conform to the general behavior of organic sulfonyl fluorides, especially in regard to reactivity and stability.

For the sake of comparison, the sulfonyl chloride of the synthetic mineral oil fraction was prepared according to a modified procedure derived from references in the prior art, such as Gilman ["Organic Syntheses," col. vol. I., page 85 (N. Y. 1932)], Harding [J. Chem. Soc. 119, 1261 (1921)], and Stewart [ibid 121, 2556 (1922)], wherein chlorosulfonic acid ($HOSO_2Cl$) and the hydrocarbons are reacted. The crude mineral oil sulfonyl chloride composition was obtained as a blackish-brown, slightly viscous oil in 61.4 per cent yield of theory. The sulfur and chlorine contents found were 10.79 per cent and 11.50 per cent respectively. In contrast to the corresponding sulfonyl fluoride mixture (prepared and described above), the sulfonyl chloride composition was found to be more reactive and less stable. It could not be distilled even under high vacuum without appreciable composition and, upon allowing it to stand at room temperature, it slowly decomposed, liberating hydrogen chloride gas and increasing in viscosity.

*Amidation of the sulfonyl fluoride mixture*

Because the crude sulfonyl fluoride was available in a larger quantity than the purified material, the former was used in most of the amidation experiments, including those performed for the purpose of determining the optimum conditions for the amidation process. The following is a description of the process of amidation. Amidation of organic sulfonyl fluorides with urea and related compounds takes place over a relatively wide range of temperatures. The reaction appears to be represented by the following equation:

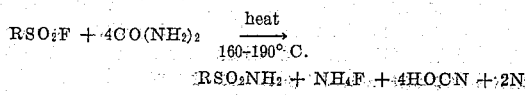

wherein R is the hydrocarbon part of the molecule as set forth hereinbefore.

EXAMPLE I

One part by weight of crude sulfonyl fluoride composition was mixed with 2.2 parts urea in a large Pyrex test tube, equipped with a thermometer, shielded in a glass tube extending down into the mixture, and an upright air condenser. The portion of the test tube containing the mixture was immersed in an oil bath, and the contents was heated at an internal temperature of 170° C. for eight hours with frequent agitation. At 135-140° C. the mixture became completely molten, and at 165-170° C. an evolution of gas occurred. This gas was detected as ammonia at the top of the air condenser. A white crystalline sublimate also collected along the sides of the condenser. After heating, the brown, semi-hard, heterogeneous reaction mass was broken up by alternate agitation with water and ether; the former dissolved excess urea and other water-soluble products, while the ether took into solution the sulfonamide. The ether layer was separated from the aqueous layer and, after washing it with water (using a little saturated sodium chloride solution to resolve any emulsions formed), the ether solvent was evaporated off on a steam-bath. Seven-tenths part crude sulfonamide was obtained as a reddish-brown, viscous liquid. This was purified by stirring with a slight excess of dilute sodium hydroxide solution (about 5 per cent), separating the reddish-brown alkaline solution from the dark insoluble substance (probably sulfone), and after adding the several water-washes of the insoluble substance to the main alkaline solution, the latter was then decomposed with a slight excess of dilute hydrochloric acid. The precipitated sulfonamide was extracted with ether, and the ether solution containing the pure sulfonamide was treated essentially in the same manner as the crude product. Five-tenths part of pure sulfonamide was obtained as a light reddish-brown, viscous liquid. From the original aqueous layer, by removing the occluded ether on a steam-bath, acidifying with dilute hydrochloric acid, extracting with ether, and following through as before, about 0.1 part more of pure sulfonamide was obtained, making a total yield of pure sulfonamide of about 0.6 part by weight, equivalent to 56.8 per cent of theory. By analysis, it was found to contain 13.69 per cent sulfur (calculated for the mixture, 14.61 per cent) and 5.22 per cent nitrogen (calculated, 6.39 per cent). This product represents the purified synthetic mineral oil sulfonamide composition ($RSO_2NH_2$) and consists of a mixture of hydrocarbon sulfonamides.

EXAMPLE II

The amidation of the purified sulfonyl fluoride composition required higher reaction temperatures (see Table IV) to give favorable yields.

Using the same proportions of reactants as the case of the crude sulfonyl fluoride, but operating at a reaction temperature of 190° C., the purified sulfonyl fluoride gave a 69.0 per cent yield of the pure sulfonamide composition.

The results obtained from a study of the determination of the optimum conditions, namely the molar ratio of the reactants, and the time and temperature of the amidation reaction, are presented in Tables I, II, III, and IV. The crude sulfonyl fluoride was used to obtain the results for the first three tables; the pure sulfonyl fluoride was used for the last one. In all cases the per cent yield of the pure sulfonamide composition was determined and the relation between this value and that for the particular factor or condition used in the amidation experiment was studied. From a study of Tables I, II, III and IV, the following conclusions may be drawn in regard to the optimum reaction conditions.

The amidation reaction seems to proceed better when an excess of urea is used. It would not be practical to use a molar quantity of urea less than 6, because the yields would be too low, or above 8, because then the mixture of reactants would become too bulky leading to difficult and inefficient mixing. A suitable range of the molar ratio of sulfonyl fluoride:urea is 1:6-1:8, and preferably 1:8. The molar ratio 1:8 is equivalent to 1 part by weight of sulfonyl fluoride to 2.2 parts of urea. This molar ratio will insure an adequate excess of urea and, consequently, of ammonia during the reaction at all times.

Amidation will occur below 150° C. and above 190° C. However, the yields are appreciably lower below 150° C. or above 190° C. Also, at temperatures above 190° C., the tendency to form undesirable side reaction products increases. A suitable temperature range is 160-190° C., and preferably 170° C.

Although a reaction will take place in less than one hour and more than 16 hours, it is not advisable to carry the reaction less than two hours or more than eight hours on account of low yields. Prolonged heating also favors the formation of side reaction products. A suitable range is 2-8 hours, and preferably 8 hours which is a safe value for all general purposes.

The optimum conditions designated above and applicable for the particular sulfonyl fluorides used in the examples are flexible and are not to be construed in a limiting sense. Occasions may arise wherein these optimum conditions may have to be adjusted one way or the other, as for example the time period of the amidation process may be influenced by the size of the batch of sulfonyl fluoride used, that is to say, the larger the batch taken the longer will be the time required to amidate it favorably. Also, the application of this method of amidation to other organic sulfonyl fluorides, whether they are composed of single-like molecules or mixtures of dissimilar molecules, may require reaction conditions slightly different from the optimum ones found for the particular sulfonyl fluoride compositions used in the foregoing specific examples, but readily determined by those skilled in the art.

The advantages of amidation with urea over other amidation procedures is clearly demonstrated by the data collected in Table V.

TABLE I

*Effect of change of quantity of urea on amidation*

[Temperature: 170° C.; time: 4 hours.]

| Molar ratio: fluoride: urea | Yield of pure sulfonamide (percent of theory) |
| --- | --- |
| 1:4 | 40.6 |
| 1:6 | 50.7 |
| 1:8 | 56.8 |

TABLE II

*Effect of change of temperature on amidation*

[Molar ratio: 1:8; time: 8 hours.]

| Temp. of reaction (°C.) | Yield of pure sulfonamide (percent of theory) |
| --- | --- |
| 150 | 26.4 |
| 160 | 50.7 |
| 170 | 56.8 |
| 180 | 54.8 |
| 190 | 44.6 |

TABLE III

*Effect of change of time on amidation*

[Molar ratio: 1:8; temp.: 170° C.]

| Time of reaction (hrs.) | Yield of pure sulfonamide (percent of theory) |
| --- | --- |
| 1 | 26.4 |
| 2 | 56.8 |
| 4 | 56.8 |
| 8 | 56.8 |
| 16 | 48.7 |

TABLE IV

*Effect of change of temperature on amidation*

[Molar ratio: 1:8; time: 8 hours.]

| Temp. of reaction (°C.) | Yield of pure sulfonamide (percent of theory) |
| --- | --- |
| 170 | 22.3 |
| 180 | 56.8 |
| 190 | 69.0 |

TABLE V

*Effect of different amidating agents on the sulfonyl fluoride composition*

| Amidating Agent | Experiment Condition | Time of Reaction (hrs.) | Yield of Pure Sulfonamide (percent of Theory) |
| --- | --- | --- | --- |
| PART A: USE OF CRUDE SULFONYL FLUORIDE COMPOSITION | | | |
| Liquid Ammonia | Pressure at Room Temp. | 336 | 60.8. |
| Concentrated Aqueous Ammonia | Room Temp | 1,608 | 48.6. |
| Concd. Aqueous Ammonia+NH₃ Gas | Steam-Bath Temp. | 17.5 | 28.4. |
| Alcoholic Ammonia | Combn. Room and Reflux Temps. | 7 | 4.1. |
| Ammonium Carbonate | Decomposition Temp. of (NH₄)₂CO₃. | To complete decompn. of carbonate. | Negligible. |
| Urea | At 170° C | 8 | 56.8. |
| PART B: USE OF PURE SULFONYL FLUORIDE COMPOSITION | | | |
| Liquid Ammonia | Pressure at Room Temp. | 360 | 73.0. |
| Urea | At 190° C | 8 | 69.0. |

Table V, Part A, shows the behavior of various amidating agents on the crude sulfonyl fluoride composition. The extent of amidation in each case is expressed in terms of the pure sulfonamide obtained. The condition under which each amidating agent was used and the reaction period of each experiment are also shown. The effectiveness of urea is evident. For example, with urea as the amidating agent the reaction time is eight hours to obtain an about 60 per cent yield, whereas with liquid ammonia an equivalent yield is found after a reaction period 40 times longer. Similar advantages in the use of urea as an amidating agent are to be noted in contrast with other amidating agents.

Table VI shows by means of the sulfur and nitrogen contents that the pure sulfonamide compositions made from different reactions and using different reactants are identical. The theoretical or calculated per cent sulfur and nitrogen for the pure sulfonamide composition are 14.61 and 6.39 respectively. In the example where the sulfonamide was prepared from the sulfonyl chloride composition, the latter was amidated as soon as possible after its preparation before any appreciable decomposition occurred.

TABLE VI

*Pure sulfonamide compositions from different reactions and reactants*

| Sulfonyl Halide Used | Amidating Agent Used | Pure Sulfonamide: Per cent Sulfur | Pure Sulfonamide: Per cent Nitrogen |
|---|---|---|---|
| Sulfonyl (Chloride (crude). | Concd. Aqueous NH₃. | 14.06 | 5.41 |
| Sulfonyl Fluoride (pure). | Liquid Ammonia. | 13.74 | 5.81 |
| Do | Urea | 13.77 | 5.15 |

While the present invention has been described in terms of specific embodiments thereof, those skilled in the art will understand that variations and modifications may be made. Thus, for example, the use of urea in the amidation of sulfonyl fluorides obtained from a petroleum stock which is predominantly aromatic in character has been described. However, the amidation may be carried out with related compounds of urea such as alkyl, aralkyl, alkaryl, aryl and acyl ureas in which the substituent group does not contain more than about 26–30 carbon atoms and sulfonyl fluorides derived from aliphatic, cycloaliphatic and aromatic hydrocarbons. In general, the sulfonamides of the present invention have the following formula:

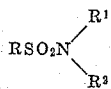

wherein R=alkyl, cycloalkyl, aryl (fused or unfused benzene rings), alkaryl, aralkyl and cycloalkaryl, and
R¹ and R²=hydrogen, alkyl, cycloalkyl, aryl, alkaryl, aralkyl and cycloalkaryl.

It will be understood that when a mixture of sulfonyl fluorides is used, the amidated product is a mixture of the corresponding sulfonamides. Furthermore, as stated hereinbefore, the sulfonyl fluoride mixture may contain sulfonyl fluorides having more than one sulfonyl fluoride group (SO₂F) when the reaction temperatures are higher than those employed in the specific example provided hereinbefore and, consequently, a more generalized formula for the sulfonamides is R(SO₂NR¹R²)ₙ wherein R, R¹ and R² represent the same substituent groups as before and $n$ is a small integer, 1 to 3. However, it is preferred to employ monosulfonyl fluorides such as benzenesulfonyl fluoride, toluenesulfonyl fluoride and higher homologues thereof, xylenesulfonyl fluoride, trimethylbenzenesulfonyl fluorides, tetramethylbenzenesulfonyl fluorides, naphthalenesulfonyl fluoride and homologues thereof, anthracene- and phenanthrenesulfonyl fluorides and homologues thereof and tetralinsulfonyl fluoride. Other operative sulfonyl fluorides are 2,4-m-xylenedisulfonyl fluoride, 3,3'-diphenyldisulfonyl fluoride, 6,6'-dimethyl - 3,3' - diphenyldisulfonyl fluoride and 1,3,5-benzenetrisulfonyl fluoride. All of the foregoing fluorides and similar sulfonyl fluorides may be amidated. However, it is to be noted that the more highly alkylated an aromatic sulfonyl fluoride is, i. e. the more alkyl groups present the greater appears to be its resistance to amidation. On the other hand, the length of the alkyl chain appears to affect the ease of amidation to some extent. However, monoalkyl aromatic compounds having an alkyl substituent containing up to 26 to 30 carbon atoms may be employed.

Urea is the preferable amidating agent for the process of this invention because of its cheapness and availability. Similar or related compounds of urea, such as for example, urea derivatives, addition compounds, condensation products and/or other similar compounds which are capable of liberating ammonia upon heating at an elevated temperature, preferably between 150–190° C., and whose decomposition products, if any, dissolve in water or are removable by water, may also be used. A few examples of operative related urea compounds are: thiourea, methylthiourea, biuret, methylurea, phenylurea, ethylenediurea, acetylurea, guanylurea, alloxan and the like. Although these substances are operative, their use would be limited because they are more expensive and less available than urea. When N-substituted ureas are used mixtures of N-substituted and unsubstituted sulphonamides are obtained.

The organic sulfonyl fluorides and urea were reacted preferably in the dry state. The amidation reaction may also take place in situ, that is, in the presence of a high-boiling, inert organic solvent or suspending medium, such as for example aromatic hydrocarbons, alcohols, ethers, and other similar substances which do not interfere chemically with the reaction. Examples of such inert solvents or suspending media are p-cymene, amylbenzene, diethyleneglycol, and diphenyloxide. There is, however, no particular advantage in employing a solvent or suspending medium, because the amidation reaction ordinarily goes smoothly and in a conveniently controllable manner when the reactants are simply mixed together and heated in the dry state. Also, as has been previously indicated from the prior art, the use of a solvent generally favors the formation of urea products.

Ether was preferably selected for dissolving out or extracting the sulfonamides. Other solvents may be used which do not interfere with the normal operation of the process, particularly those that do not cause the formation of emulsions difficult to resolve.

It is to be understood that the terms "petroleum oil sulfonyl fluoride" and "petroleum oil sulfonamide" designate the novel sulfonyl fluorides R(SO₂F)ₙ and the novel sulfonamides

prepared from mineral oil, both natural and synthetic, and fractions thereof and, particularly, those fractions which are characterized by the presence of a substantial amount of aromatic compounds both mononuclear and polynuclear.

I claim:
1. The method for preparing an organic sulfonamide from an organic sulfonyl fluoride of an aromatic mineral oil hydrocarbon, which comprises: reacting said organic sulfonyl fluoride with urea at a temperature between about 160° C. and about 190° C.

2. The method for preparing an organic sulfonamide from an organic sulfonyl fluoride of a synthetic aromatic mineral oil, which comprises: reacting said organic sulfonyl fluoride with urea at a temperature between about 160° C. and about 190° C.

3. The method for preparing a mixture of organic sulfonamides from a mixture of organic sulfonyl fluorides of a hydrocarbon mixture containing a predominant quantity of alkyl benzenes, naphthalene and alkyl naphthalenes, and containing paraffins and naphthenes, which comprises: reacting said mixture of organic sulfonyl fluorides with urea at a temperature between about 160° C. and about 190° C.

4. The method for preparing a mixture of organic sulfonamides from a mixture of organic sulfonyl fluorides of an aromatic mineral oil having an A. P. I. gravity of about 27.9 and an A. S. T. M. distillation range from about 364° F. to about 524° F., which comprises: reacting said mixture of organic sulfonyl fluorides with urea at a temperature between about 160° C. and about 190° C.

MARIO S. ALTAMURA.

REFERENCES CITED

The following references are of record in the file of this patent:

UNITED STATES PATENTS

| Number | Name | Date |
| --- | --- | --- |
| 2,174,856 | Johnson | Oct. 3, 1939 |
| 2,236,168 | Dietrich | Mar. 25, 1941 |
| 2,276,097 | Salzberg | Mar. 10, 1942 |
| 2,335,554 | Wayne | Nov. 30, 1943 |
| 2,337,532 | Thomas | Dec. 21, 1943 |

OTHER REFERENCES

Steinkopf et al. "J. Prakt. Chem.," vol. 117 (1927) pages 1 to 82.

Certificate of Correction

Patent No. 2,450,863. October 5, 1948.

MARIO S. ALTAMURA

It is hereby certified that error appears in the printed specification of the above numbered patent requiring correction as follows:

Column 5, line 55, for the word "composition" read *decomposition*;

and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.*